Jan. 29, 1957  W. R. McKAY  2,779,113
GRADING AND LEVELING SCRAPERS
Filed Feb. 25, 1952  3 Sheets-Sheet 1
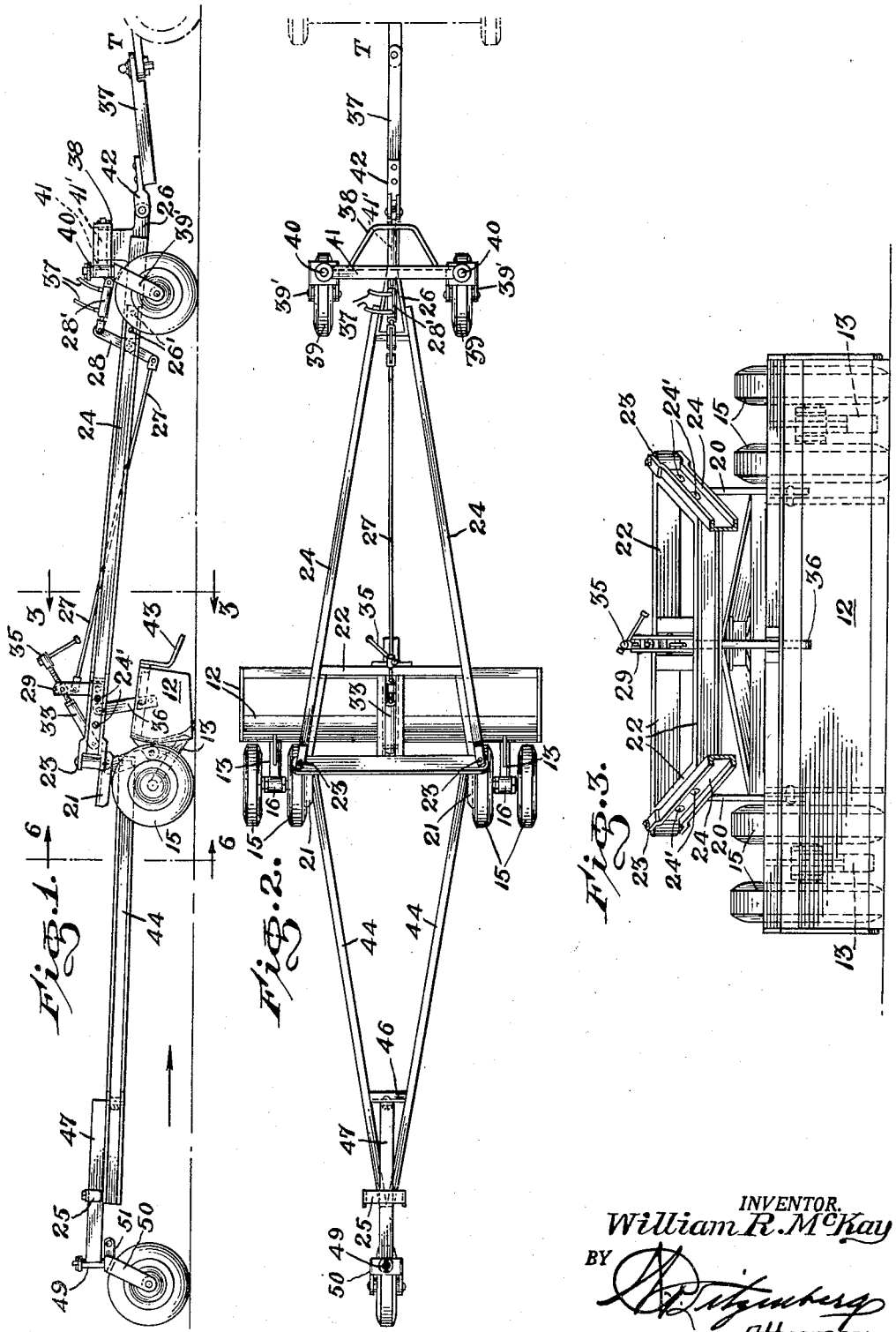
INVENTOR.
William R. McKay
BY
Attorney.

Jan. 29, 1957 W. R. McKAY 2,779,113
GRADING AND LEVELING SCRAPERS
Filed Feb. 25, 1952 3 Sheets-Sheet 2
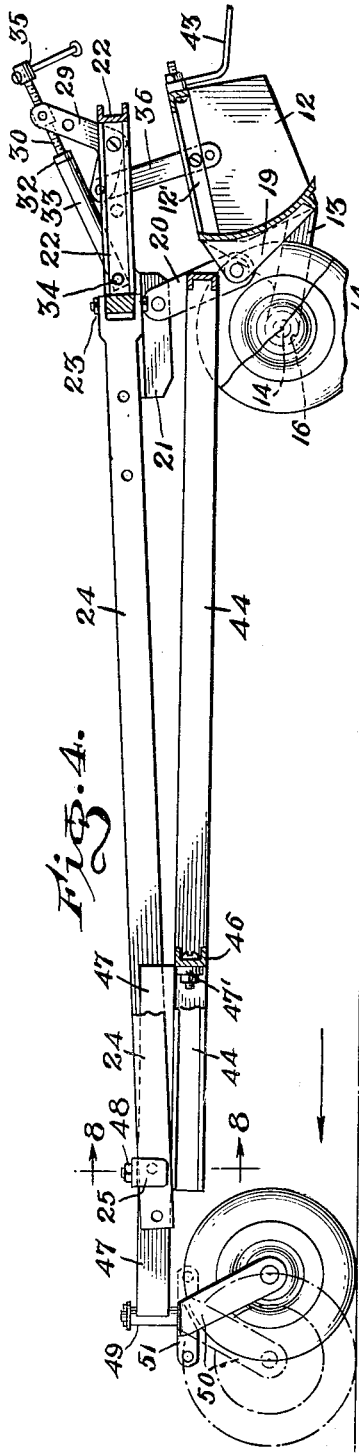
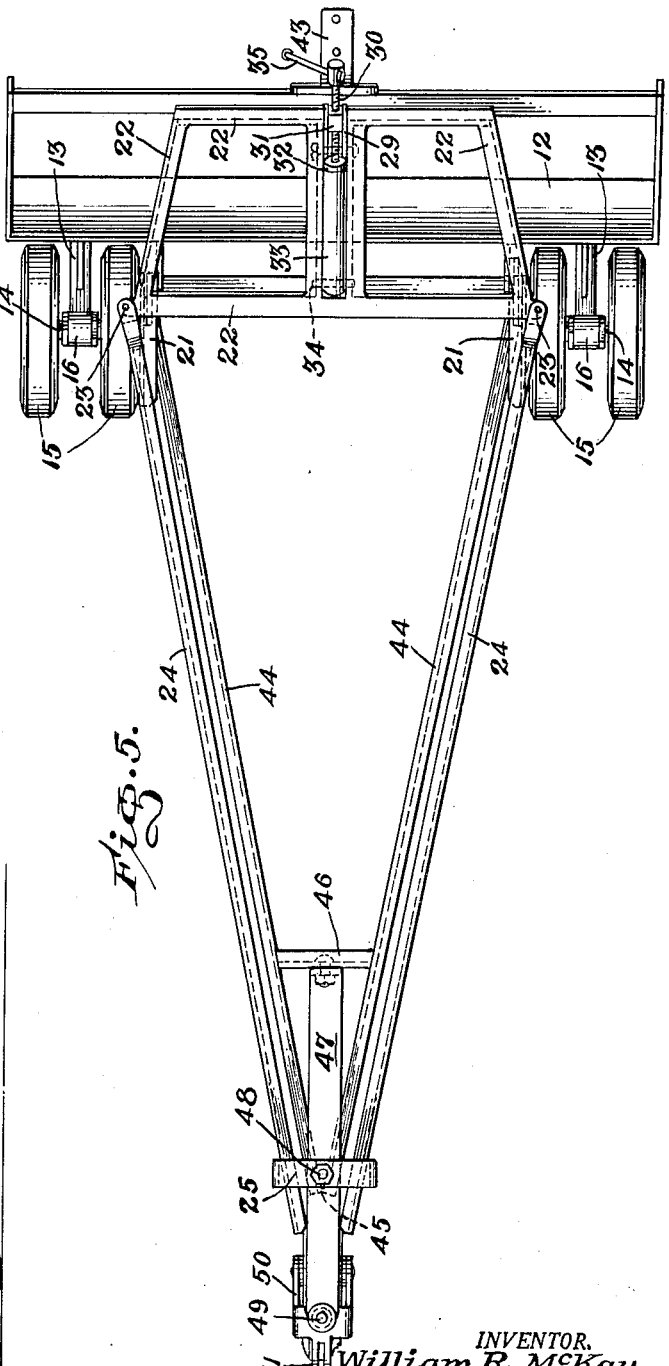
INVENTOR.
William R. McKay
BY
Attorney.

Jan. 29, 1957 W. R. McKAY 2,779,113
GRADING AND LEVELING SCRAPERS
Filed Feb. 25, 1952 3 Sheets-Sheet 3
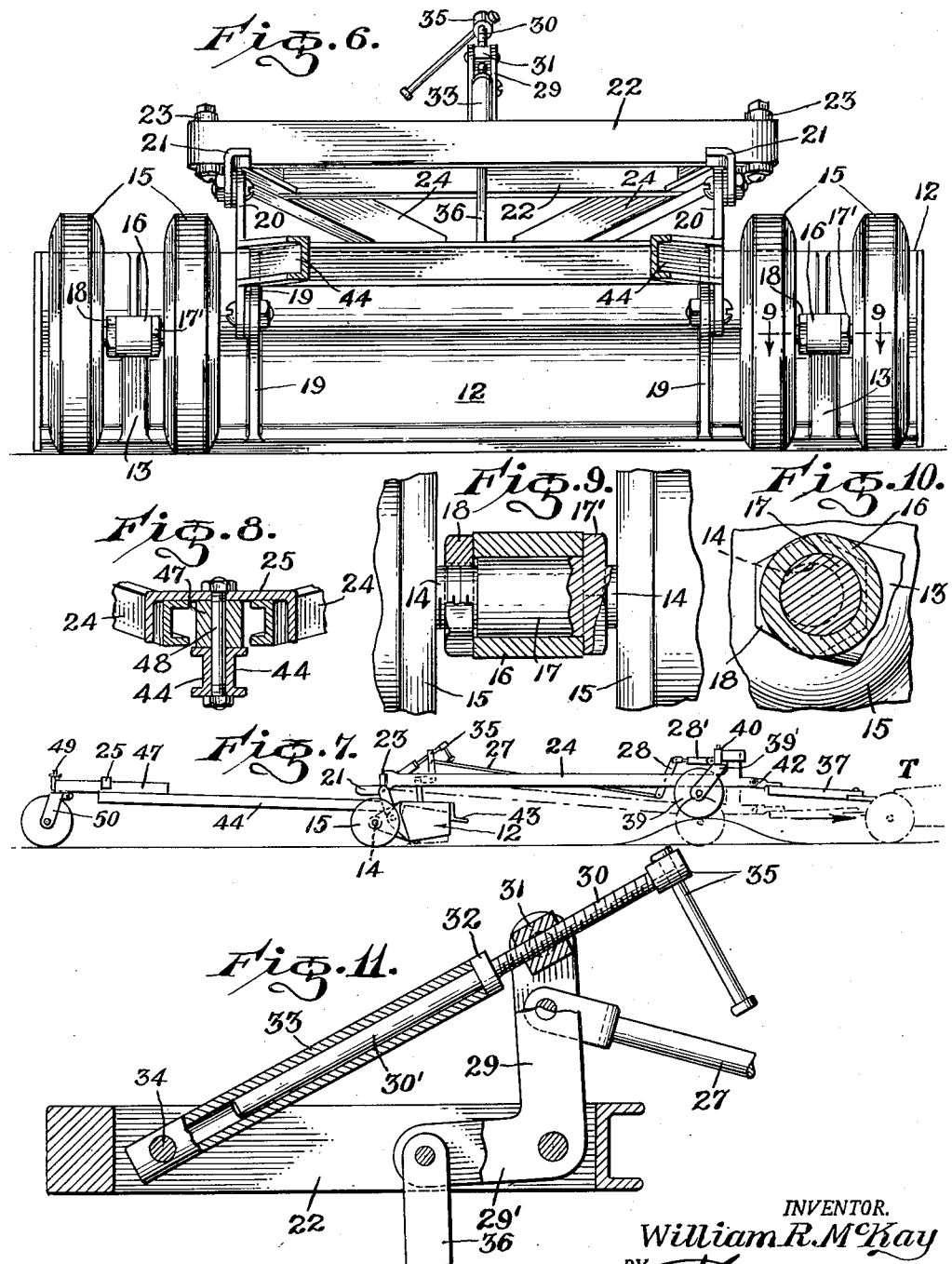
INVENTOR.
William R. McKay
Attorney.

United States Patent Office 2,779,113
Patented Jan. 29, 1957

2,779,113
GRADING AND LEVELING SCRAPERS
William R. McKay, Compton, Calif.

Application February 25, 1952, Serial No. 273,247

10 Claims. (Cl. 37—180)

This invention relates to grading and leveling scrapers, and more particularly to that type of grading and leveling scrapers in which the scraper bowl is adjustably supported and carried on wheels which are immediately behind the scraper bowl, with forwardly and rearwardly extending overhead carrying links or frame arms for automatically correcting the cutting position of the scraper bowl regardless of the amount of vertical movement of the tractor drawbar.

The objects of the invention are:

To provide a grading and leveling scraper of the character referred to, in combination with the axles of the wheels which are near the opposite ends of the bowl, with eccentric supporting bearings which make it possible to easily adjust the structure supported on said wheels and axles for better accuracy in regulating the cutting edge of the scraper bowl;

To provide in such a grading and leveling mechanism, an adjustment screw by means of which the scraper bowl can be easily and quickly adjusted for the proper cutting depth, and whereby also the bowl can be easily adjusted to spill dirt from the bowl into low places over which it moves;

To provide in such a grading and leveling machine, a front supporting link or frame, the side members of which can be released and swung around over a similar rear link or supporting structure, whereby the overall length is shortened to approximately one-half of the full operating length, thus greatly facilitating the job of moving the machine from one location to another;

To provide supporting means for the scraper bowl which makes it possible to adjust the opposite ends of said scraper bowl separately; and by supporting the bowl at the center on wheels, I do away with the necessity of a long truss frame;

To provide in a scraper of the character referred to, means whereby the scraper bowl is pushed forwardly so as to cut high spots instead of moving over them;

To provide in such a grading and leveling scraper means whereby the scraper bowl can be raised and lowered by a hand screw, or manually, or to which hydraulic means for moving can be used.

Other objects and advantages of the invention will be seen in the following detailed description of a grading and leveling scraper mechanism, taken with the accompanying three sheets of drawings, in which:

Figure 1 is a side elevation of a grading and leveling scraper in its extended or operating position, hitched to a tractor T by means of a coupling link;

Figure 2 is a plan view looking down on the structure shown in Fig. 1;

Figure 3 is a vertical sectional view as it would be seen from the line 3—3 on Fig. 1;

Figure 4 is a side elevation of the machine with the front carrying link or frame structure swung around over the rear link structure, for moving the machine from place to place. The front castor wheels are detached;

Figure 5 is a plan view of the showing in Fig. 4;

Figure 6 is a vertical section, taken on the line 6—6, on Fig. 1;

Figure 7 is a small side view to illustrate the movement of the front supporting link when moving over a bump in the surface and over which the machine is to pass, and showing the relatively small movement of the scraper bowl;

Figure 8 is a sectional detail, taken on line 8—8 on Fig. 4;

Figure 9 is a fragmentary view, partly in section, to show the eccentric bearing on the short wheel axle;

Figure 10 is a sectional view through said eccentric bearing; and

Figure 11 is an enlarged view, with parts in section, of an adjustment screw mechanism for adjusting the scraper bowl.

Referring now in detail to the drawings, I will describe the embodiment of the invention here illustrated for explanatory purposes:

The scraper bowl, designated 12, is supported in part by two downwardly inclined arms, as 13, 13, the upper ends of which are pivotally connected with short axles 14, 14, between two pairs of wheels 15, 15, at the opposite sides of the middle portion of the main structure. Each short axle, between its pair of wheels, is provided with an eccentric bearing, Figs. 9 and 10, which includes a cylindrical outer member 16, and an inner bearing member 17, mounted eccentrically on said short axle or shaft. Said bearing 17 has at one end, as a part thereof, a nut-like portion 17', by means of which said eccentric bearing member can be turned on said short axle, within said cylinder 16, to raise and lower said outer member 16, which is formed on the upper end of the arm 13. At the other end of said eccentric bearing member 17, on said short axle 14, is a nut 18, for locking said parts together to prevent lateral movement and to prevent turning of said bearing member in said outer member 16, and the upper end of the arm 13.

On the back side of said scraper bowl 12, toward the opposite ends thereof, are two bearing webs, as 19, 19, Fig. 6, secured to the back of the scraper blade, to which are pivotally connected two connecting links, as 20, 20, which links are pivotally secured, at their upper ends, to two depending angle plates 21, 21, secured to the under side of the corners of a rectangular frame 22, seen in plan view in Fig. 5.

Hinged to the opposite forward corners of said frame 22, as at 23, 23, are two arms or links 24, 24, extended forwardly, as shown in Figs. 1 and 2. The ends of said arms or links 24, 24 are secured to the opposite sides of a small triangular frame 26, of channel iron, and can be detached therefrom by removing the bolts 26'. The hinged end of each arm, which are bolted to the opposite sides of the frame 22, can also be released by removing the bolts 24', so that said arms or links 24, 24 can be swung outwardly and around to the opposite side of the wheels 15, 15, and attached under the downwardly depending portions of a holding member 25, as seen in Figs. 4 and 5. This adjustment is made when it is desired to move the machine to another job.

A rod or link 27 is connected to the lower end of a rocker arm or lever 28, and at its other end said rod 27 is connected to the upper arm of a bell-crank 29, as seen in Fig. 1. An operating screw 30, operating through a threaded nut element 31, on the arm 29 of said bell crank is seen in Fig. 11. A collar 32 is secured on said screw at the end of the threads and the unthreaded length 30' of said screw telescopes into a pipe 33, pivotally anchored in the frame 22, as at 34. Said screw is provided at its upper end with a head and operating handle, as at 35. The other arm 29' of the bell-crank 29 is pivotally connected to a link 36 which, in turn, is pivoted to the scraper bowl 12, as seen in Fig. 4, where a top cross member of angle iron, as 12', is shown and to which said link 36 is pivotally connected for lifting said bowl.

When the arms or links 24, 24 are placed under the holding member 25, then if the screw 30 is turned by its handle 35, it will rock the bell-crank 29 forwardly and raise the scraper bowl to the position shown in Fig. 4, said bell-crank 29 being held against the frame member 22, thus serving also to lock said arms 24, 24 against being pressed downwardly enough to be released from the holding member 25.

The bell-crank 29 is seen in upright position in Fig. 1, with the scraper bowl down. It can also be moved to raise the bowl with the connecting rod or link 27, from the rocker arm 28, which is connected to be moved by hydraulic power, as from the hydraulic cylinder 28', having the supply and return tubes 38 connected therewith, as shown in said Fig. 1.

By reference to Figs. 1 and 2, an auxiliary truck is here shown, coupled to a tractor, designated T, by a coupling link 37, which auxiliary truck has the small triangular frame 26, heretofore referred to, said frame having an upstanding portion as seen in Fig. 2. Said auxiliary truck has a bail 38 extended forwardly around said upstanding portion as seen in Fig. 2, to provide a bearing to prevent tipping a pin 41' pivotally connecting these parts. The wheels of said auxiliary truck are mounted as caster wheels 39, 39, having the fork members 39', 39' thereover, with swivel bearings at their tops, as at 40, 40, with a cross beam or member 41. A pivoted connecting member 42, which is shown connected with the coupling link 37, connected with the tractor T, is used to couple said auxiliary truck to a member 43, on the scraper 12, as seen in Fig. 1, for the purpose of pulling said auxiliary truck along with said bowl, when it is to be moved to another job. This is done after the arms or links 24, 24 have been disconnected and swung around to the rear, as in Figs. 4 and 5, and the rod link 27 has been removed, and said coupling member 42 has been disconnected from the link 37. This auxiliary truck is turned around and its member 42 is connected to the member 43 on the scraper to be moved therewith.

Secured to the links 20, 20 are side members or arms 44, 44 converge, as at 45 and have a short cross member 46 welded between them, as seen in Figs. 1, 2, 4 and 5. A straight coupling member, or tongue, 47 has a downwardly depending flange, as 47', secured to said cross member 46, as seen in Fig. 4. Said tongue 47 is extended rearwardly under the holding member 25, with a bolt 48 extending downwardly therethrough, as shown. The outer end of said tongue member 47 is provided with a swivel bearing 49 to receive the bearing of a caster wheel, designated as a whole 50. The fork of said caster wheel 50, has a short coupling tongue 51 projecting therefrom for use in pulling said grader when moving it from place to place. Said caster wheel will then be turned from the position shown in light broken lines in Fig. 4, to the position shown in full lines in said figure. This tongue member 47 can be of various lengths, as may be desired, and thus extend the length of the structure.

In transporting the machine from place to place, it is towed backwardly. In operation, the bowl wheels 15, 15 and the rearward caster wheel 50, are moving over a surface which has been leveled by the scraper bowl. Any vertical movement of the front caster or auxiliary truck, 39, 39, as indicated in light broken lines in Fig. 7, will result in a very slight vertical movement of the bowl, as indicated by the light broken line of the bowl in said Fig. 7. This is due to the long arms 24 and the short connection from the rear of said arms 24 to the bowl 12, by the link 36.

A cross beam or member 41, which connects the two spaced caster wheels 39, 39, is pivotally connected in its middle portion, as seen at 41', Fig. 1, so as to rock on a horizontal axis. This makes possible the movement of said spaced caster wheels 39, 39, vertically relative to each other, as if one of said wheels run over a slight bump in the surface.

Thus I have provided an improved grading and leveling scraper machine in which it is possible to reduce the overall length thereof for moving from place to place, by providing extended arms which can be released and swung around to overlie and be held in place along side of other fixed extended arms. I have also provided a scraper bowl support which is different by placing the carrying wheels rearwardly thereof and adjacent the opposite ends of the bowl, with pivoted supporting arms and links which make it possible to adjust and regulate the position of the cutting edge of said bowl with accuracy and with comparative ease. Many objections to present equipment of this character have been eliminated in my improved grading and leveling scraper, and a great reduction in cost of producing and operating such mechanism has been made.

I do not, however, limit my invention to the details of construction and arrangement shown for descriptive purposes, except as I may be limited by the hereto appended claims.

I claim:

1. In a grading and leveling scraper: a scraper bowl having a back wall with a cutting lower edge, spaced supporting members secured to the rear of said wall, carrier wheels rearwardly of and adjacent said bowl, at its opposite ends, two downwardly inclined arms extending from said wheel axles to said bowl, a horizontal rectangular frame above said bowl and said wheels, two connecting links extending from said frame to the spaced supporting members on the back of said bowl, a lifting link pivotally connected at its lower end with the top of said bowl, a pivotally supported bell-crank in said rectangular frame the lower arm of which is connected to the upper end of said lifting link, a manually operable screw connected between said frame and the other arm of said bell-crank for moving said bell-crank for raising said bowl, a pair of arms connected to said connecting links and converging rearwardly therefrom, a caster wheel at the rearward ends of said rearwardly converging arms, and hitching arms from said horizontal frame forwardly for pulling said scraper.

2. In a grading and leveling scraper: a scraper bowl having a back wall with a cutting lower edge, carrier wheels rearwardly of the adjacent said bowl, at its opposite ends, connecting arms extending from the axles of said wheels to said back wall, a rectangular frame above said bowl and said wheels, two connecting links extending from said frame to the back wall of said scraper, above said connecting arms, a lifting link extending from said frame to the top of said bowl, a bell-crank in said frame the lower arm of which is connected with the upper end of said lifting link, an operating screw connected between said frame and the upper arm of said bell-crank for moving said bell-crank to lift said bowl, a pair of arms connected to said connecting links and converging rearwardly therefrom, a caster wheel at the rearward ends of said rearwardly converging arms, and hitching arms extending forwardly of said bowl and converging at their forward ends with means for coupling them to a power machine for pulling said scraper.

3. A grading and leveling scraper as set forth in claim 2 in which the forward converging ends of said arms are provided with a carrying caster wheel truck for coupling said scraper to a power machine for pulling it.

4. In a grading and leveling scraper: a scraper bowl, carrier wheels rearwardly of and adjacent the opposite ends of said bowl, a horizontal frame above said wheels and said bowl, pivotal connecting links extending from said frame to said bowl for movably supporting said bowl, a lifting link extending from said frame to the top of said bowl, a bell-crank pivotally supported in said frame with its lower arm connected between said frame and the upper end of said lifting link, an operating screw connected with the other arm of said bell-crank for moving said bell-crank to lift said bowl, two forwardly extending arms having their rearward ends pivotally connected to said horizontal frame, said arms converging at their forward ends, a carrying caster truck for the forward ends of said arms and for coupling it with a power machine, two arms extending rearwardly from said connecting links and converging at their rearward ends, a caster wheel supporting the rearward ends of said arms, whereby said forwardly extending arms and said rearwardly extending arms form supporting means for control of the movements of said scraper bowl vertically in operation.

5. A grading and leveling scraper as set forth in claim 4 in which the forward ends of said forwardly converging arms are detachable from said carrying caster truck and are movable outwardly and around over said rearwardly extending arms, whereby to shorten the overall length of said mechanism for transportation, with means for holding the ends of said arms in inoperative positions along said rearwardly extending arms.

6. A grading and leveling scraper as set forth in claim 4, in which the converging ends of said rearwardly extending arms are provided with a tongue extension coupling said arms with said caster wheel, whereby the length of said rearward structure can be lengthened as may be desired.

7. A grading and leveling scraper as set forth in claim 4, in which a link is connected with the upper arm of said bell-crank, the other end of which link is connected to an operating lever, with means for connecting hydraulic power to said lever, said means including a hydraulic cylinder with supply and return tubes for hydraulic fluid to said cylinder.

8. In a grading and leveling scraper of the character shown, in combination with carrier wheels and a scraper bowl carried thereby and immediately in front of said wheels, a horizontal frame above said bowl, a pair of forwardly extending arms having their rearward ends pivotally connected with said frame and converging at their forward ends, a caster wheel truck with which said ends are detachably connected, a pair of connecting links operatively connected between said frame and said bowl, a pair of rearwardly extending arms having their forward ends connected to said connecting links and their rearward ends connected together and provided with a caster wheel support therefor, said forwardly extending arms being movable on their pivotal connections outwardly and around to the rear and along side of said rearwardly extending arms, whereby to reduce the overall length of said structure for transportation, means for locking the free ends of said movable arms to said rearwardly extending arms, and means connected with said horizontal frame and said bowl and operable to lift said bowl for transportation purposes.

9. A grading and leveling scraper as set forth in claim 8 in which the caster wheel truck includes two caster wheels at opposite sides of the forward connected ends of said arms, with a cross beam therebetween, said cross beam having swivel connections at its opposite ends with said caster wheels and in its middle having pivotal connection with said truck, whereby said caster wheels can move vertically relative to each other as said cross beam rocks on said pivotal connection.

10. In a grading and leveling scraper, the combination with a scraper bowl and the supporting and operating connections therefor, of two forwardly extending arms converging at their forward ends and provided with a caster wheel support, a pair of connecting links operatively connected between said frame and said bowl, and two rearwardly extending arms connected to said connecting links and converging at their rearward ends and provided with a caster wheel support, said forwardly extending arms being detachable from their caster wheel support and movable outwardly and around to the rear and along side of said rearwardly extending arms, locking means for holding said free ends, and means for lifting and holding said scraper bowl in a raised position for transportation from place to place.

References Cited in the file of this patent

UNITED STATES PATENTS

| | | |
|---|---|---|
| 1,487,413 | Watters | Mar. 18, 1924 |
| 1,671,939 | Smith | May 29, 1928 |
| 1,968,412 | Lull | July 31, 1934 |
| 2,108,541 | Lull | Feb. 15, 1938 |
| 2,314,888 | Manning | Mar. 30, 1943 |
| 2,444,977 | Clark | July 13, 1948 |
| 2,464,227 | Gurries et al. | Mar. 15, 1949 |
| 2,614,346 | Howard | Oct. 21, 1952 |
| 2,624,133 | Smeed | Jan. 6, 1953 |